(12) United States Patent
Guo et al.

(10) Patent No.: US 10,915,710 B2
(45) Date of Patent: Feb. 9, 2021

(54) CLAUSE ANALYSIS BASED ON COLLECTION COHERENCE IN LEGAL DOMAIN

(71) Applicant: INTERNATIONAL BUSINESS MACHINES CORPORATION, Armonk, NY (US)

(72) Inventors: Zhili Guo, Beijing (CN); HongLei Guo, Beijing (CN); Song Xu, Beijing (CN); Shiwan Zhao, Beijing (CN); Elaine M. Branagh, Austin, TX (US); Pitipong Jun Sen Lin, Brookline, MA (US); Zhong Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 16/144,534

(22) Filed: Sep. 27, 2018

(65) Prior Publication Data

US 2020/0104365 A1    Apr. 2, 2020

(51) Int. Cl.
*G06F 40/30* (2020.01)
*G06Q 50/18* (2012.01)
*G06F 16/901* (2019.01)

(52) U.S. Cl.
CPC .......... *G06F 40/30* (2020.01); *G06F 16/9024* (2019.01); *G06Q 50/18* (2013.01)

(58) Field of Classification Search
CPC ...... G06F 40/30; G06F 40/205; G06F 16/367; G06F 16/9024; G06F 16/3329; G06F 16/3344
See application file for complete search history.

(56) References Cited

U.S. PATENT DOCUMENTS 8,849,860 B2 *   9/2014   Ilyas ........................ G06N 5/02
                                                        707/791
9,058,308 B2     6/2015   Shastri et al.
                        (Continued)

OTHER PUBLICATIONS

Wang, J., Li, J., Li, S., Kang, Y., Zhang, M., Si, L., & Zhou, G. (Jul. 2018). Aspect Sentiment Classification with both Word-level and Clause-level Attention Networks. In IJCAI (vol. 2018, pp. 4439-4445). (Year: 2018).*

(Continued)

*Primary Examiner* — Richemond Dorvil
*Assistant Examiner* — Mark Villena
(74) *Attorney, Agent, or Firm* — Tutunjian & Bitetto, P.C.; Joseph Petrokaitis

(57) ABSTRACT

A method is provided for clause analysis in a legal domain. The method builds a coherence graph from a set of labeled training documents by (a) creating entity nodes from and of a same type as entities extracted from the set of labeled training documents, (b) creating clause nodes from labeled clauses in the set of labeled training documents, (c) forming bi-directional edges (i) between each of the clause nodes and the entity nodes belonging thereto, (ii) among parent-child clause nodes from among the clause nodes, and (iii) among same-level sibling clause nodes from among the clause nodes. The method merges nodes, from among the entity and clause nodes, that have a same semantic meaning. The method weights the bi-directional edges using a coherence metric. The method identifies a clause structure of a new document by matching the new document against the coherence graph using a node-covering algorithm.

20 Claims, 10 Drawing Sheets

(56) References Cited

U.S. PATENT DOCUMENTS

| | | | | |
|---|---|---|---|---|
| 9,336,192 | B1* | 5/2016 | Barba | G06F 40/30 |
| 10,585,924 | B2* | 3/2020 | Nguyen | G06F 40/30 |
| 2010/0293451 | A1* | 11/2010 | Carus | G06N 20/00 |
| | | | | 715/230 |
| 2011/0055206 | A1 | 3/2011 | Martin et al. | |
| 2015/0106378 | A1 | 4/2015 | Clark et al. | |
| 2015/0331850 | A1* | 11/2015 | Ramish | G06F 16/245 |
| | | | | 704/9 |
| 2015/0356418 | A1* | 12/2015 | Yampolska | G06F 16/38 |
| | | | | 707/739 |
| 2017/0103466 | A1 | 4/2017 | Syed | |
| 2018/0024992 | A1 | 1/2018 | Gidney | |
| 2018/0103052 | A1* | 4/2018 | Choudhury | H04L 63/1425 |
| 2018/0357220 | A1* | 12/2018 | Galitsky | G06F 40/205 |
| 2019/0065626 | A1* | 2/2019 | Cameron | G06K 9/00288 |

OTHER PUBLICATIONS

Azzopardi et al., "Integrating Natural Language and Formal Analysis for Legal Documents", Conference on Language Technologies & Digital Humanities, Sep. 2016, 2 pages.

Galgani et al., "Combining Different Summarization Techniques for Legal Text", Proceedings of the Workshop on Innovative Hybrid Approaches to the Processing of Textual Data (Hybrid2012), EACL 2012, Apr. 2012, pp. 115-123.

\* cited by examiner

CLAUSE ANALYSIS BASED ON COLLECTION COHERENCE IN LEGAL DOMAIN

BACKGROUND

Technical Field

The present invention generally relates to data processing, and more particularly to clause analysis based on collection coherence in the legal domain.

Description of the Related Art

Portable Document Format (PDF) is the de facto format for saving legal documents such as, for example, regulations, contracts, master agreements, statements of work, supplements, and so forth. Texts in PDF files are perceived as pictures and are, thus, hard to analyze. For example, lines in PDF files are not equal to conventional paragraphs, and so forth. Accordingly, applications need to parse PDF files into structured information for better governance, understanding, augmentation, and compliance checking. To that end, clause analysis is a fundamental parsing process. However, conventional clause analysis techniques suffer from being prone to various types of errors relating to sequencing characters, grouping characters into tokens, grouping tokens into characters, using multiple columns, left-right versus right-left reading order, using special characters, using fonts with irregular spacing, and using pages with rotated text and/or rotated pages. Accordingly, there is a need for an improved approach for clause analysis in documents such as, but not limited to, legal documents.

SUMMARY

According to an aspect of the present invention, a computer-implemented method is provided for clause analysis in a legal domain. The method includes building, by a processor device, a coherence graph from a set of labeled training documents by (a) creating entity nodes from and of a same type as entities extracted from the set of labeled training documents, (b) creating clause nodes from labeled clauses in the set of labeled training documents, (c) forming bi-directional edges (i) between each of the clause nodes and respective ones of the entity nodes belonging thereto, (ii) among parent-child clause nodes from among the clause nodes, and (iii) among same-level sibling clause nodes from among the clause nodes. The method further includes merging, by the processor device, nodes, from among the entity nodes and the clause nodes for the set of labeled training documents, that have a same semantic meaning. The method also includes weighting, by the processor device, the bi-directional edges using a coherence metric. The method additionally includes identifying, by the processor device, a clause structure of a new document by matching the new document against the coherence graph using a node-covering algorithm.

According to another aspect of the present invention, a computer program product is provided for clause analysis in a legal domain. The computer program product includes a non-transitory computer readable storage medium having program instructions embodied therewith. The program instructions are executable by a computer to cause the computer to perform a method. The method includes building, by a processor device of the computer, a coherence graph from a set of labeled training documents by (a) creating entity nodes from and of a same type as entities extracted from the set of labeled training documents, (b) creating clause nodes from labeled clauses in the set of labeled training documents, (c) forming bi-directional edges (i) between each of the clause nodes and respective ones of the entity nodes belonging thereto, (ii) among parent-child clause nodes from among the clause nodes, and (iii) among same-level sibling clause nodes from among the clause nodes. The method further includes merging, by the processor device, nodes, from among the entity nodes and the clause nodes for the set of labeled training documents, that have a same semantic meaning. The method also includes weighting, by the processor device, the bi-directional edges using a coherence metric. The method additionally includes identifying, by the processor device, a clause structure of a new document by matching the new document against the coherence graph using a node-covering algorithm.

According to yet another aspect of the present invention, a computer processing system is provided for clause analysis in a legal domain. The system includes a memory for storing program code. The system further includes a processor device for running the program code to build a coherence graph from a set of labeled training documents by (a) creating entity nodes from and of a same type as entities extracted from the set of labeled training documents, (b) creating clause nodes from labeled clauses in the set of labeled training documents, (c) forming bi-directional edges (i) between each of the clause nodes and respective ones of the entity nodes belonging thereto, (ii) among parent-child clause nodes from among the clause nodes, and (iii) among same-level sibling clause nodes from among the clause nodes. The processor further runs the program code to merge nodes, from among the entity nodes and the clause nodes for the set of labeled training documents, that have a same semantic meaning. The processor also runs the program code to weight the bi-directional edges using a coherence metric. The processor additionally runs the program code to identify a clause structure of a new document by matching the new document against the coherence graph using a node-covering algorithm.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to clause analysis based on collection coherence in the legal domain.

In an embodiment, the present invention includes a graph building stage and an applying (inference) stage. A coherence graph is built during the graph building stage using a set of labeled documents. During the graph building stage, for each clause in a document, the clause's title and body are linked together, with all its sub-clauses, and sibling-clauses' titles, and so forth, in order to build the coherence graph. During the inference stage, a new document is compared against the coherence graph in order to identify the clause structure of the new document. Various actions can be selectively performed responsive to the identified clause structure and the implementation. These and other features of the present invention are described in further detail hereinbelow.

Figure 1:
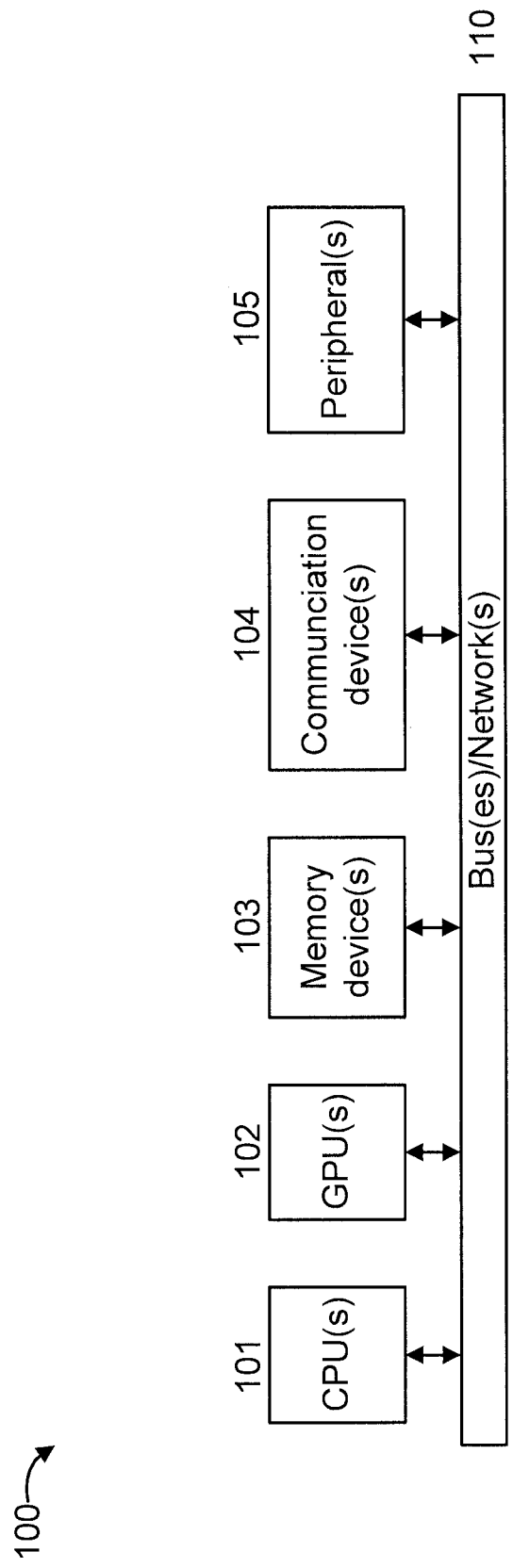
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 9-10). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
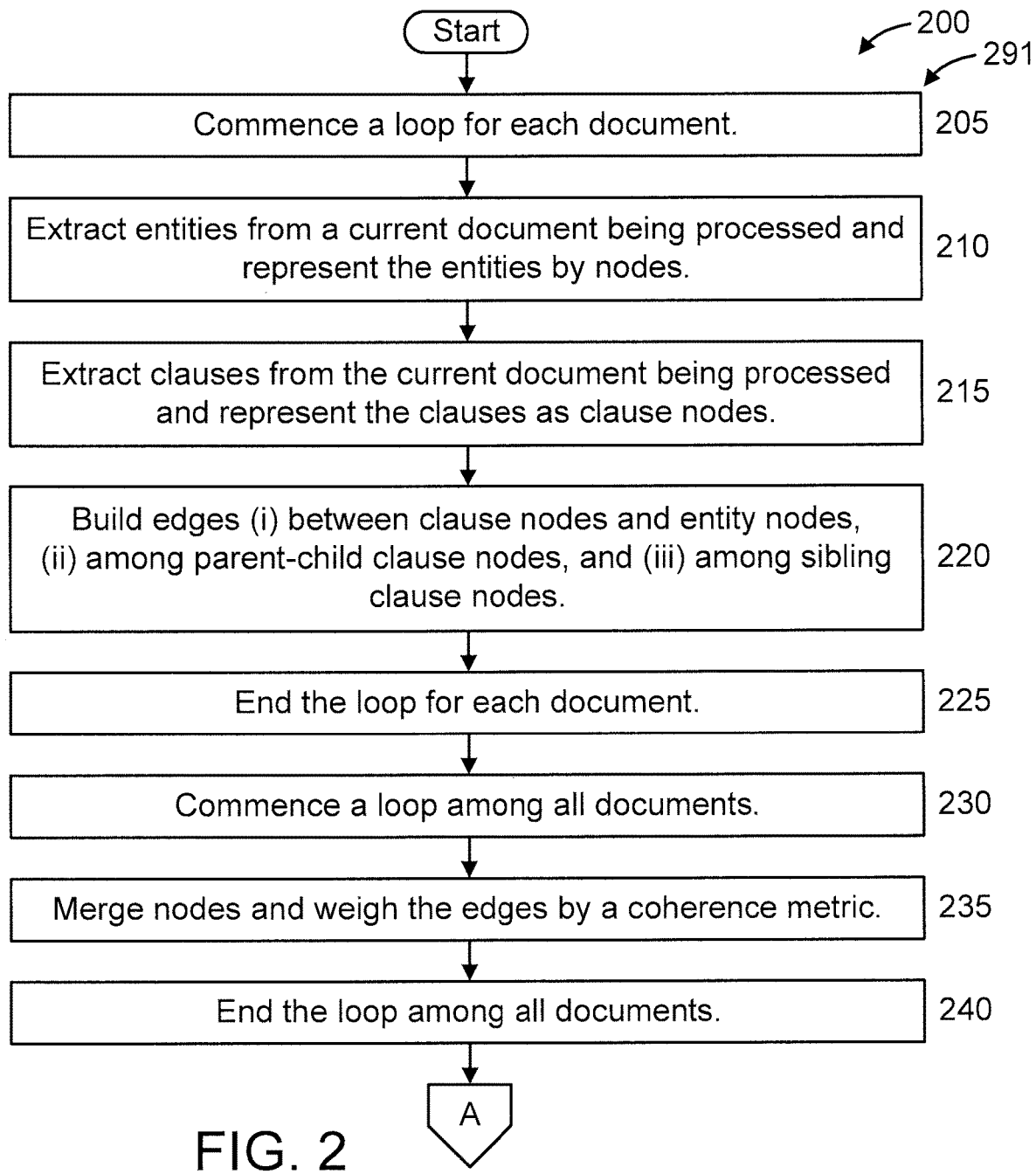
FIGS. 2-3 are flow diagrams showing an exemplary method for clause analysis based on collection coherence in the legal domain, in accordance with an embodiment of the present invention.
Figure 3:
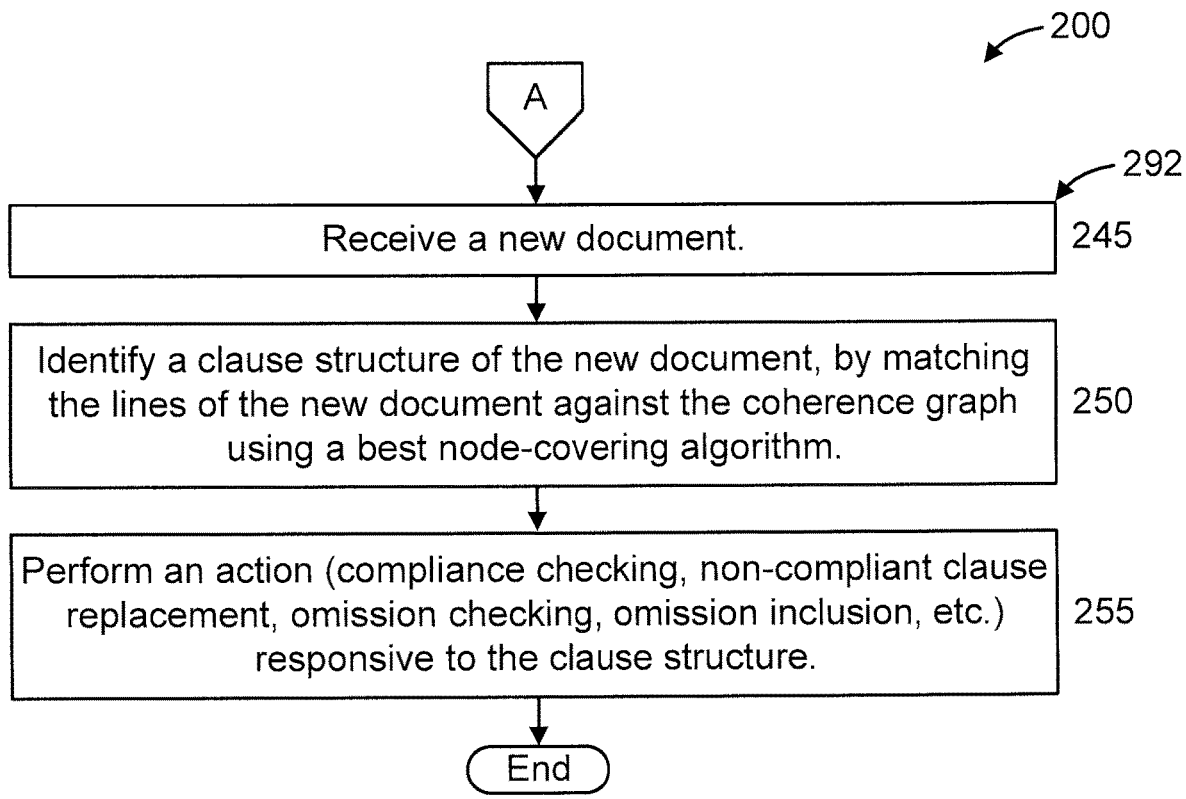

FIGS. 2-3 are flow diagrams showing an exemplary method 200 for clause analysis based on collection coherence in the legal domain, in accordance with an embodiment of the present invention.

Method 200 can be considered to involve two stages, namely a "graph building time stage" 291 and a "graph applying time stage" 292 corresponding to a graph building time and a graph applying time, respectively. The graph applying time stage 292 is also interchangeably referred to herein as the "inference stage" 292.

At block 205, commence a loop for each document. Block 205 corresponds to the start of the graph building time stage 291.

At block 210, extract entities from a current document being processed and represent the entities by nodes. The entities can include, but are not limited to, name, quantity, quality, date, state, and action. The corresponding representations for the aforementioned entities can respectively be name nodes, quantity nodes, quality nodes, date nodes, state nodes, and action nodes. As can be seen, in an embodiment, the respective representations of the entities can be the entity type. These and other representation can be used, as readily appreciated by one of ordinary skill in the art given the teachings of the present invention provided herein, while maintaining the spirit of the present invention.

At block 215, extract clauses from the current document being processed and represent the clauses by clause nodes.

At block 220, build edges (i) between clause nodes and entity nodes, (ii) among parent-child clause nodes, and (iii) among sibling clause nodes.

At block 225, end the loop for each document.

At block 230, commence a loop among all documents.

At block 235, merge nodes and weigh the edges by a coherence metric. It is to be appreciated that a result of block 235 can be groups of documents having a strong coherence with respect to each other, based on the coherence metric. For example, different ranges of the coherence metric can represent different document groups.

At block 240, end the loop among all documents. Block 240 corresponds to the end of the graph building time stage 291.

At block 245, receive a new document. Block 245 corresponds to the start of the graph applying time stage 292.

At block 250, identify a clause structure of the new document, by matching the lines of the new document against the coherence graph using a best node-covering algorithm. Block 250 corresponds to the end of the graph applying time stage 292.

At block 255, perform an action responsive to the clause structure.

Further regarding block 255, the action that is performed is dependent upon the particular implementation. For example, an one exemplary action, the clause structure, once identified, could be modified into a different clause structure. For example, the identified clause structure could be a non-compliant clause structure, such that the action involves changing the identified non-compliant clause structure into a compliant clause structure. This can prevent a document initially having an incompatible clause structure from being used until the document is modified to be made compliant with a particular set of requirements. The set of requirements can involve processing resources, format, processing time, and so forth. Moreover, optimized formats can be substituted in place of otherwise suitable but slower processed formats, where the optimized formats are designed for quick processing so as to minimize computational and processing resources implicated in processing documents having such optimized formats. The optimized format designed for quick processing can involve special characters or statement/clause structures that are designed to be more readily (i.e., quicker) recognized and/or more readily (quicker) parsed and/or so forth. As another example, omission detection can be performed at the clause level in order to detect omissions of expected and likely important clauses in documents in the legal domain. In such a case, the action can be the detection of an omission and the inclusion of the omitted material as a new clause in the new document. In this way, completeness of legal documents can be enhanced if not assured. These and other actions are readily determined by one of ordinary skill in the art, given the teachings of the present invention provided herein, while maintaining the spirit of the present invention.

Figure 4:
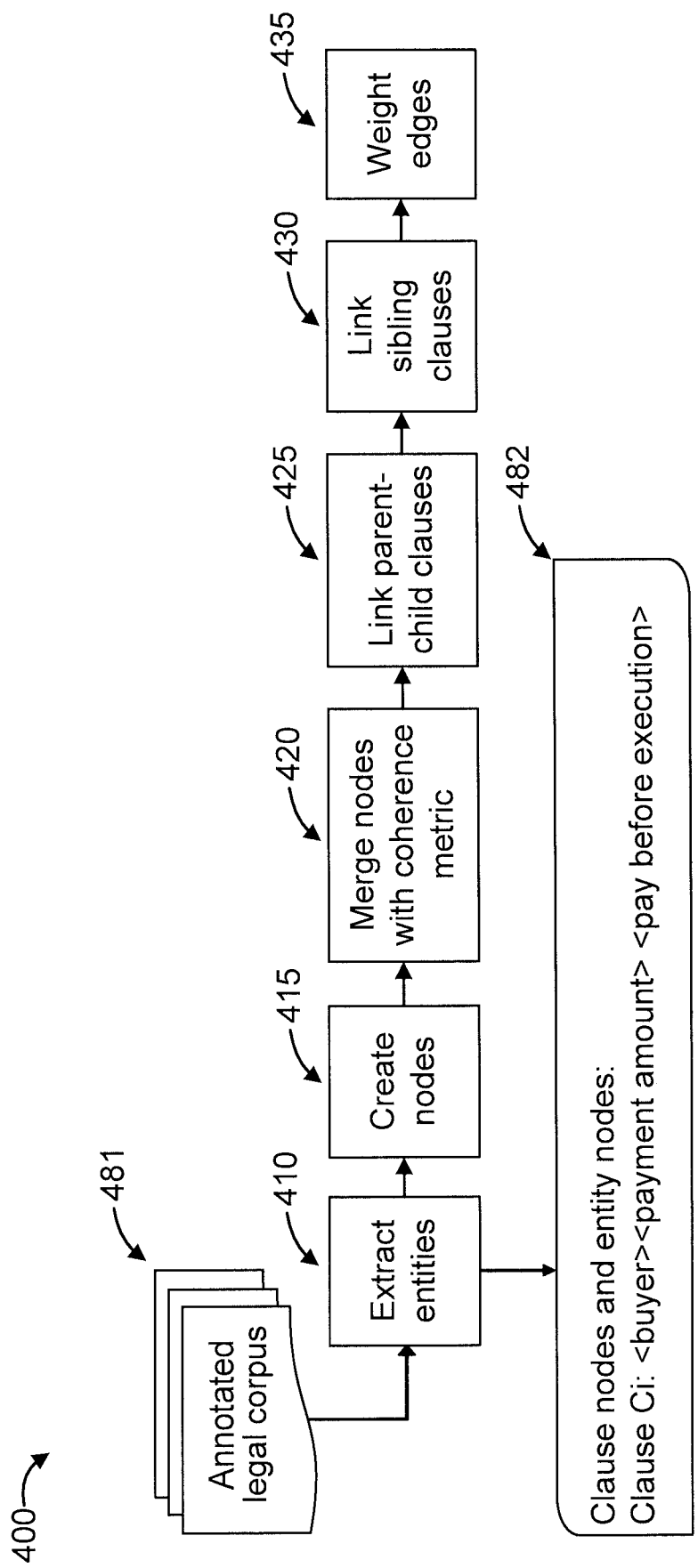
FIG. 4 is a block diagram graphically showing an exemplary method for building a coherence graph with a labeled corpus, in accordance with an embodiment of the present invention.

FIG. 4 is a block diagram graphically showing an exemplary method 400 for building a coherence graph with a labelled corpus, in accordance with an embodiment of the present invention. Method 400 can be considered to correspond to the graph building time stage 291.

At block 405, input a labelled corpus 481 that includes annotated legal documents.

At block 410, extract entities from the labelled corpus 481. The entities can be clause nodes and entity nodes 482. For example, Clause Ci can be represented as follows: <buyer> <payment amount> <pay before execution>.

At block 415, create nodes (from the entities).

At block 420, merge nodes with a coherence metric.

At block 425, link parent-child clauses.

At block 430, link sibling clauses.

At block 435, weigh edges.

Figure 5:
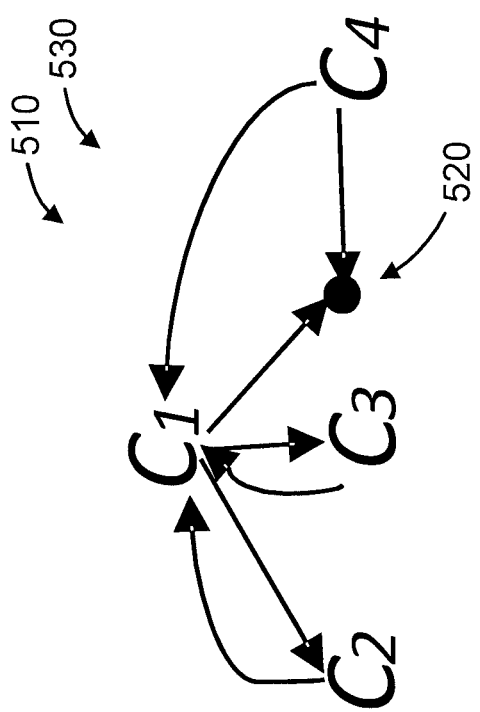
FIG. 5 is a block diagram showing exemplary clause nodes and their linkage, in accordance with an embodiment of the present invention.

FIG. 5 is a block diagram showing exemplary clause nodes 510, an entity node 520, and their linkage 530, in accordance with an embodiment of the present invention. Each of the clause nodes is represented by the letter "C" followed by a respective integer, each of the entity nodes is represented by a respective filled-in circle, and each of the edges is represented by a respective line from one node to another node.

The clause nodes 510 include nodes C1, C2, C3, and C4.

In this example, the entity nodes 520 include a single node as shown by the filled in circle.

The linkage 530 includes edge that link the clause and entity nodes.

Figure 6:
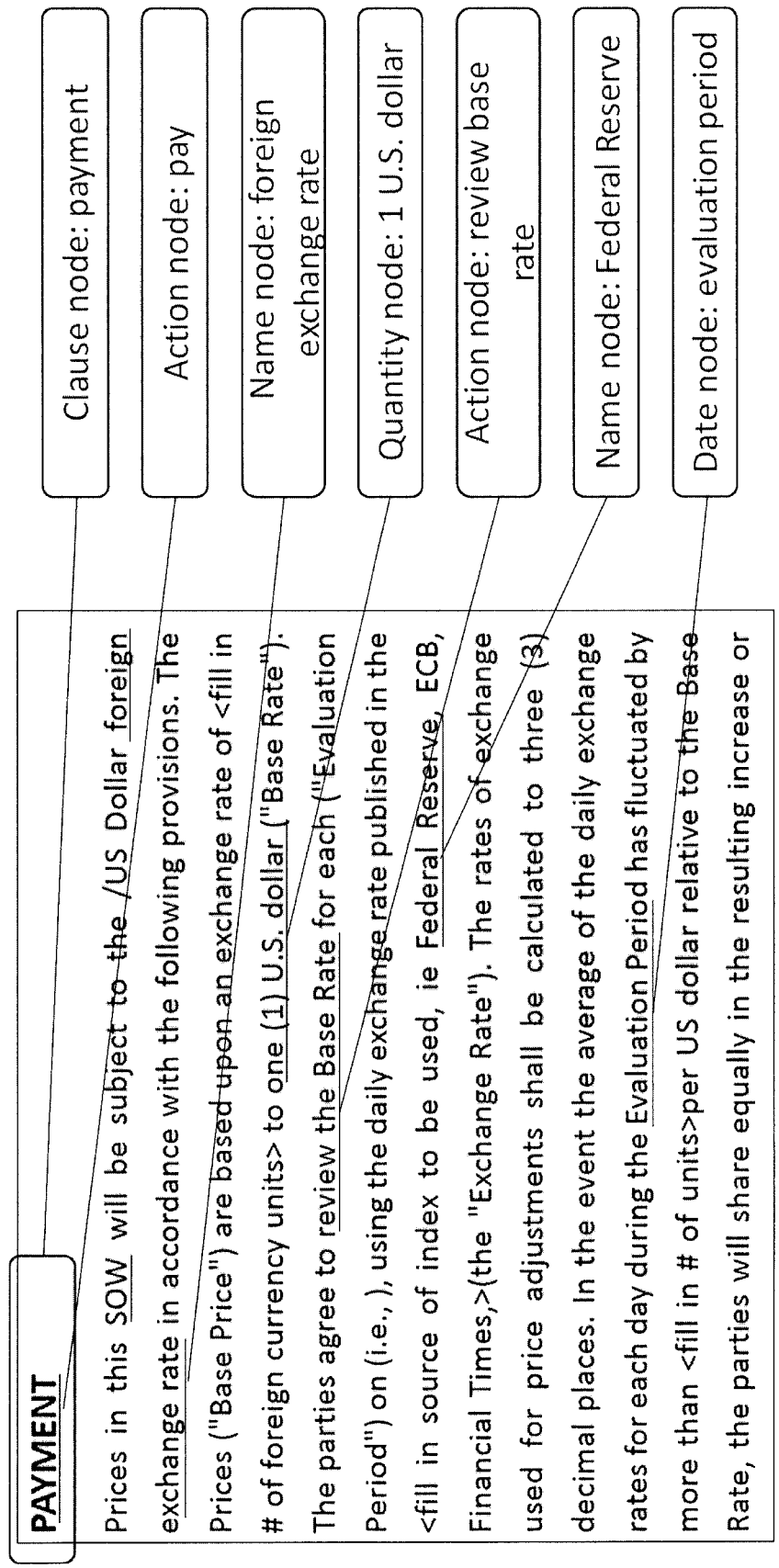
FIG. 6 is a block diagram showing an exemplary node creation process, in accordance with an embodiment of the present invention.

FIG. 6 is a block diagram showing an exemplary node creation process 600, in accordance with an embodiment of the present invention.

The node creation process 600 involves the following nodes:
(A) Clause node: payment;
(B) Action node: pay;
(C) Name node: foreign exchange rate;
(D) Quantity node: 1 U.S. dollar;
(E) Action node: review base rate;
(F) Name node: Federal Reserve; and
(G) Date node: evaluation period.

Figure 7:
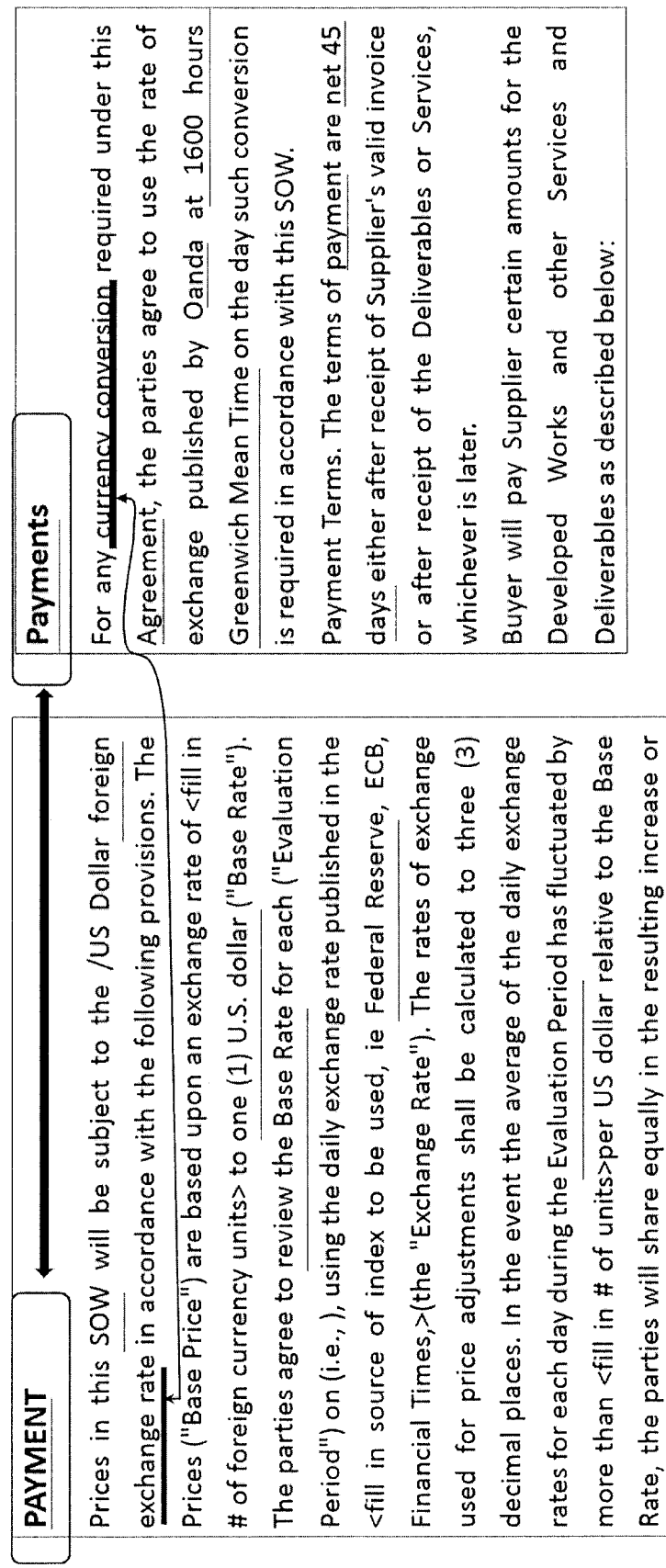
FIG. 7 is a block diagram showing an exemplary node merge process, in accordance with an embodiment of the present invention.

FIG. 7 is a block diagram showing an exemplary node merge process 700, in accordance with an embodiment of the present invention.

In the node merge process 700, the involved node types include the following: clause; action; name; quantity; and date.

In the node merge process 700, nodes of the same type and coherent meaning are merged.

Figure 8:
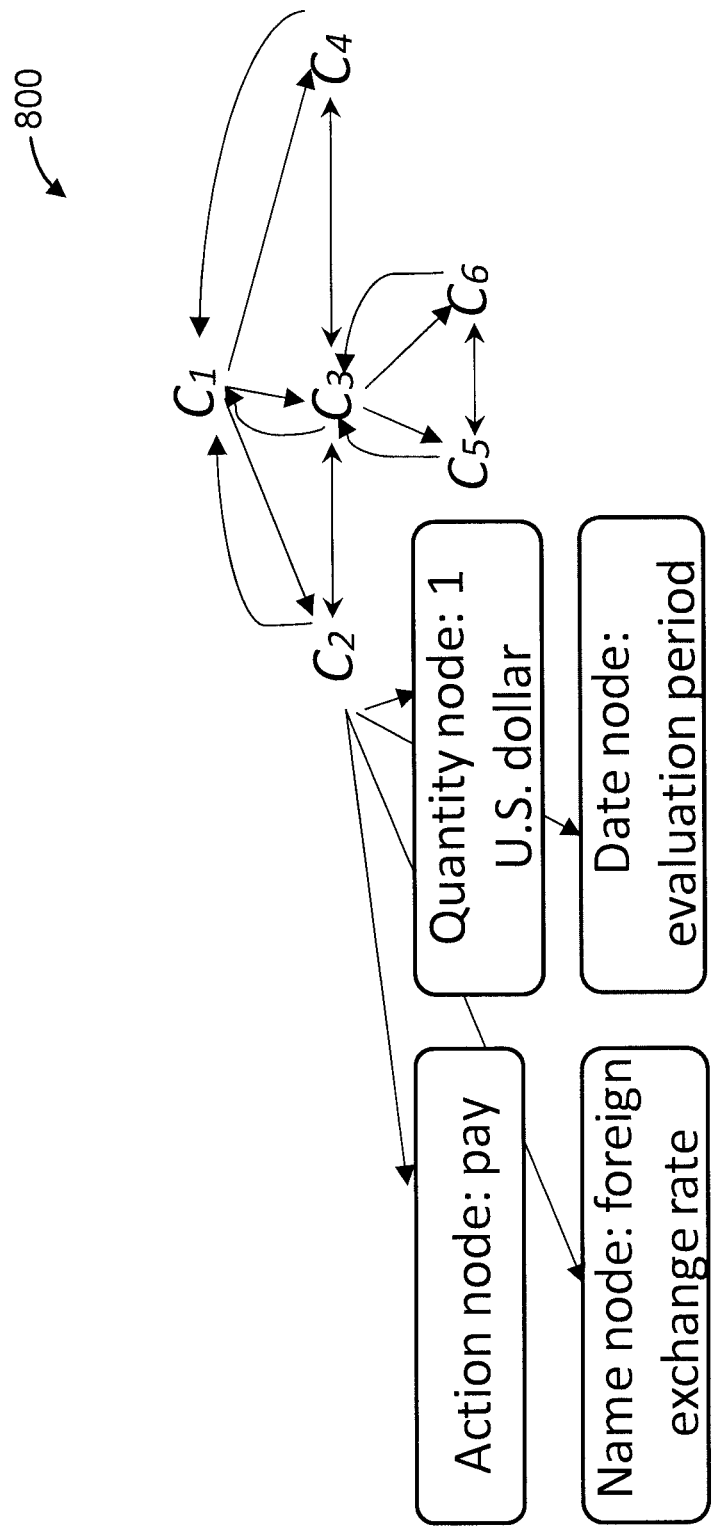
FIG. 8 is a block diagram showing an exemplary edge creation process, in accordance with an embodiment of the present invention.

FIG. 8 is a block diagram showing an exemplary edge creation process 700, in accordance with an embodiment of the present invention.

In the edge creation process 800, the following apples:
(i) create bi-directional "clause-entity" edge between clause node and its belonging entity nodes;
(ii) create "parent-child" edge between a clause node and its sub-clause nodes; and
(iii) create bi-directional "sibling" edge between adjacent clauses of same levels.

In the edge creation process 800, the involved clause nodes are C1, C2, C3, C4, C5, and C6.

In the edge creation process 800, the following (non-clause) nodes are involved, with respect to clause node C2:
(B) Action node: pay;
(C) Name node: foreign exchange rate;
(D) Quantity node: 1 U.S. dollar; and
(G) Date node: evaluation period.

A description will now be given regarding edge weighting, in accordance with an embodiment of the present invention.

In an embodiment, an empirical approach can be used as follows:

$$\text{weight}(e) = f(\text{types of connected nodes}, \text{occurrence})$$

In an embodiment, a machine learning approach can be used. In such a case, the input can include, for example: labeled documents, including lines of text, extracted entity nodes, and clause nodes. Moreover, the objective function can be to maximize the sum score resultant from a node covering algorithm. A vertex cover, aka node cover, of a graph is a set of vertices such that each edge of the graph is incident to at least one vertex in the set.

In an embodiment, method 200 can be provided as a cloud service in order to provide cloud-based document compliance checking. The service could further offer actions that can be performed depending upon the results of checking a given document. These and other implementations of method 200, including cloud and non-cloud-based implementations, are readily determined by one of ordinary skill in the art, given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
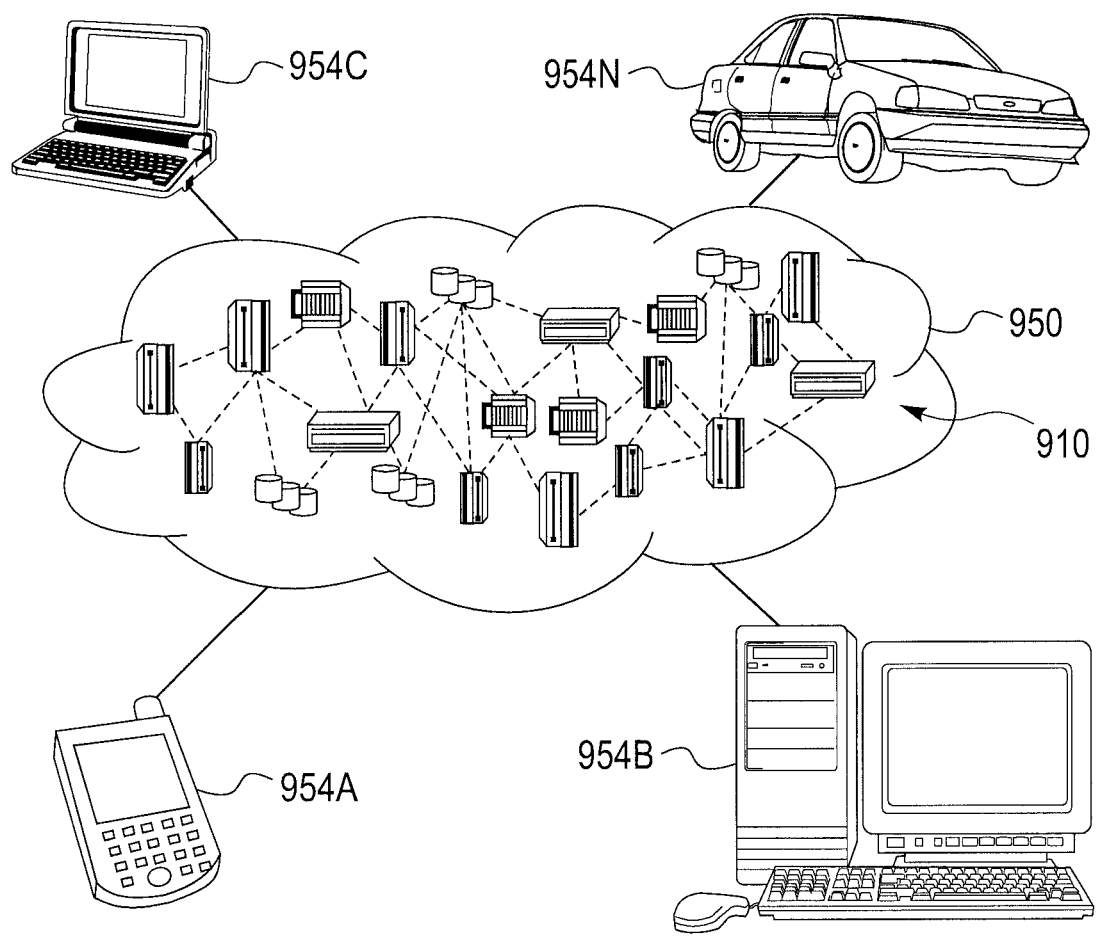
FIG. 9 is a block diagram showing an illustrative cloud computing environment having one or more cloud computing nodes with which local computing devices used by cloud consumers communicate, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
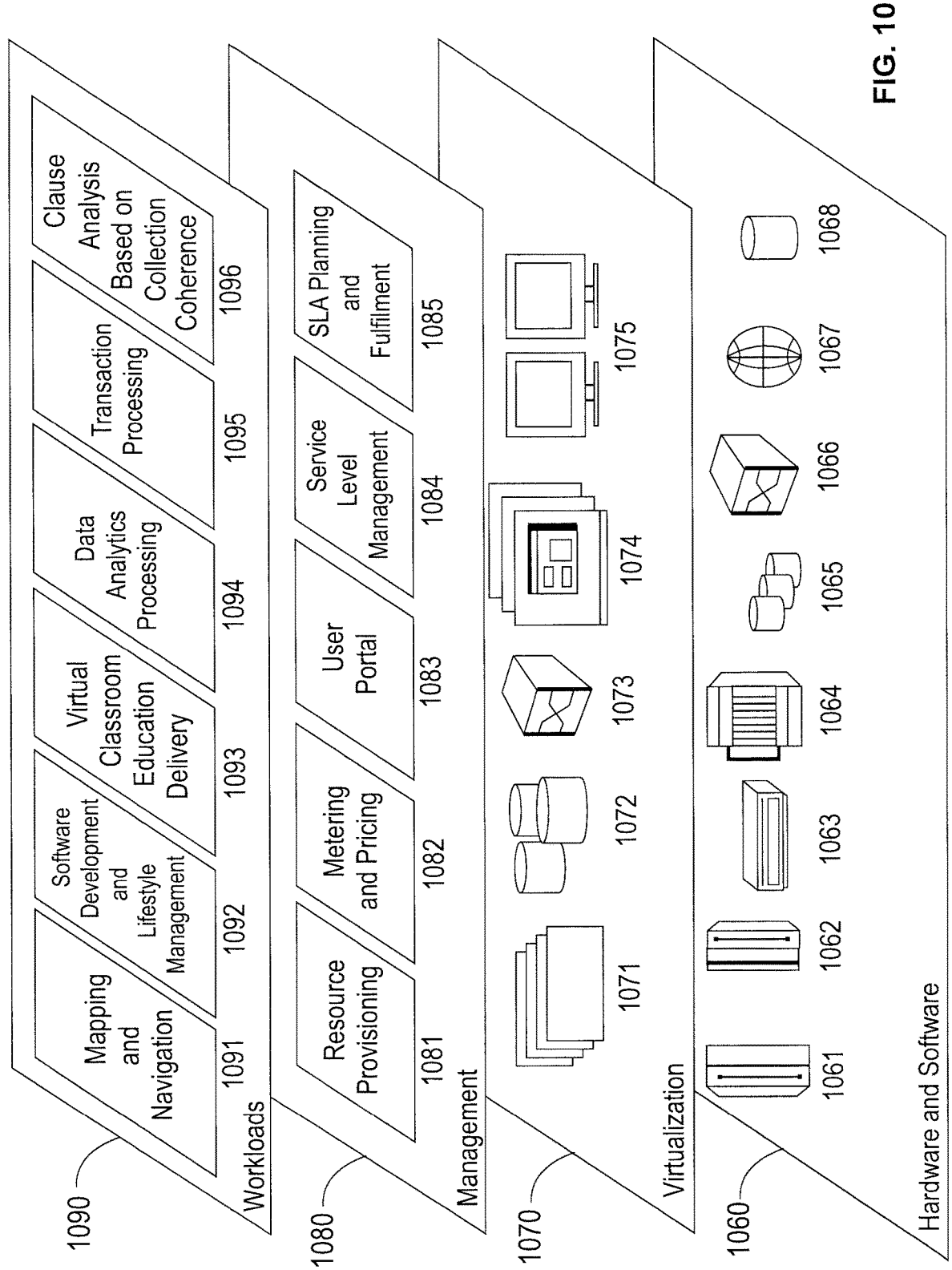
FIG. 10 is a block diagram showing a set of functional abstraction layers provided by a cloud computing environment, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and clause analysis based on collection coherence in the legal domain 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for clause analysis in a legal domain, the method comprising:

building, by a processor device, a coherence graph from a set of labeled training documents by (a) creating entity nodes from and of a same type as entities extracted from the set of labeled training documents, (b) creating clause nodes from labeled clauses in the set of labeled training documents, (c) forming bi-directional edges (i) between each of the clause nodes and respective ones of the entity nodes belonging thereto, (ii) among parent-child clause nodes from among the clause nodes, and (iii) among same-level sibling clause nodes from among the clause nodes;

merging, by the processor device, nodes, from among the entity nodes and the clause nodes for the set of labeled training documents, that have a same semantic meaning;

weighting, by the processor device, the bi-directional edges using a coherence metric; and identifying, by the processor device, a clause structure of a new document by matching the new document against the coherence graph using a node-covering algorithm.

2. The computer implemented method of claim 1, wherein the entities are selected from the group consisting of a name, a quantity, a quality, a date, a state, and an action.

3. The computer-implemented method of claim 1, wherein the clause nodes are created from and have at least a same partial title as corresponding ones of the labeled clause nodes extracted from the set of labeled training documents.

4. The computer-implemented method of claim 1, wherein two of the entity nodes have the same semantic meaning, and are merged together, when the two of the entity nodes are of a same type.

5. The computer-implemented method of claim 1, wherein two of the clause nodes have the same semantic meaning, and are merged together, when the two of the clause nodes have a same stemmed title.

6. The computer-implemented method of claim 1, wherein said weighting step comprises an empirical-based approach that weights the edges as a function of connected node types.

7. The computer-implemented method of claim 1, wherein said weighting step comprises a machine learning-based approach having an objective function that maximizes a sum score of a node covering algorithm.

8. The computer-implemented method of claim 1, further comprising determining whether the clause structure of the new document is compliant with a set of compatibility requirements, and modifying the clause structure of the new document from a non-compliant clause structure to a compliant clause structure responsive to determining a lack of compliance by said determining step.

9. The computer-implemented method of claim 1, wherein the set of labeled documents comprise legal domain documents.

10. The computer program product of claim 1, wherein said weighting step comprises an empirical-based approach that weights the edges as a function of connected node types.

11. A computer program product for clause analysis in a legal domain, the computer program product comprising a non-transitory computer readable storage medium having program instructions embodied therewith, the program instructions executable by a computer to cause the computer to perform a method comprising:

building, by a processor device of the computer, a coherence graph from a set of labeled training documents by (a) creating entity nodes from and of a same type as entities extracted from the set of labeled training documents, (b) creating clause nodes from labeled clauses in the set of labeled training documents, (c) forming bi-directional edges (i) between each of the clause nodes and respective ones of the entity nodes belonging thereto, (ii) among parent-child clause nodes from among the clause nodes, and (iii) among same-level sibling clause nodes from among the clause nodes;

merging, by the processor device, nodes, from among the entity nodes and the clause nodes for the set of labeled training documents, that have a same semantic meaning;

weighting, by the processor device, the bi-directional edges using a coherence metric; and identifying, by the processor device, a clause structure of a new document by matching the new document against the coherence graph using a node-covering algorithm.

12. The computer program product of claim 11, wherein the entities are selected from the group consisting of a name, a quantity, a quality, a date, a state, and an action.

13. The computer program product of claim 11, wherein the clause nodes are created from and have at least a same partial title as corresponding ones of the labeled clause nodes extracted from the set of labeled training documents.

14. The computer program product of claim 11, wherein two of the entity nodes have the same semantic meaning, and are merged together, when the two of the entity nodes are of a same type.

15. The computer program product of claim 11, wherein two of the clause nodes have the same semantic meaning, and are merged together, when the two of the clause nodes have a same stemmed title.

16. The computer program product of claim 11, wherein said weighting step comprises a machine learning-based approach having an objective function that maximizes a sum score of a node covering algorithm.

17. The computer program product of claim 11, wherein the method further comprises determining whether the clause structure of the new document is compliant with a set of compatibility requirements, and modifying the clause structure of the new document from a non-compliant clause structure to a compliant clause structure responsive to determining a lack of compliance by said determining step.

18. The computer program product of claim 11, wherein the set of labeled documents comprise legal domain documents.

19. A computer processing system for clause analysis in a legal domain, the system comprising:

a memory for storing program code; and a processor device for running the program code to build a coherence graph from a set of labeled training documents by (a) creating entity nodes from and of a same type as entities extracted from the set of labeled training documents, (b) creating clause nodes from labeled clauses in the set of labeled training documents, (c) forming bi-directional edges (i) between each of the clause nodes and respective ones of the entity nodes belonging thereto, (ii) among parent-child clause nodes from among the clause nodes, and (iii) among same-level sibling clause nodes from among the clause nodes;

merge nodes, from among the entity nodes and the clause nodes for the set of labeled training documents, that have a same semantic meaning;

weight the bi-directional edges using a coherence metric; and identify a clause structure of a new document by matching the new document against the coherence graph using a node-covering algorithm.

20. The computer processing system of claim 19, wherein the clause nodes are created from and have at least a same partial title as corresponding ones of the labeled clause nodes extracted from the set of labeled training documents.

* * * * *